(12) United States Patent
Gudlavenkatasiva et al.

(10) Patent No.: US 8,299,939 B2
(45) Date of Patent: Oct. 30, 2012

(54) METHOD AND APPARATUS FOR UTILITY USAGE MONITORING

(75) Inventors: Bhaskar R. Gudlavenkatasiva, Tampa, FL (US); George L. Hughes, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 484 days.

(21) Appl. No.: 12/605,125

(22) Filed: Oct. 23, 2009

(65) Prior Publication Data

US 2011/0095903 A1    Apr. 28, 2011

(51) Int. Cl.
*G08C 19/00* (2006.01)
(52) U.S. Cl. ............... 340/870.02; 725/14; 725/139; 725/93; 725/109; 725/32

(58) Field of Classification Search ............... 725/14, 725/139, 93, 109, 32, 91, 87, 102, 148; 340/870.02
See application file for complete search history.

(56) References Cited

U.S. PATENT DOCUMENTS

| | | | |
|---|---|---|---|
| 7,379,791 B2 * | 5/2008 | Tamarkin et al. | 700/286 |
| 2008/0272933 A1 * | 11/2008 | Cahill-O'Brien et al. | 340/870.02 |
| 2009/0109056 A1 * | 4/2009 | Tamarkin et al. | 340/870.02 |

* cited by examiner

*Primary Examiner* — Lam T Mai

(57) ABSTRACT

An approach is provided for monitoring utility usage and generating notifications. A platform collects utility data from a utility meter of a subscriber and determines whether the utility data satisfies a usage threshold. The platform generates a notification based on the determination and presents the notification.

14 Claims, 7 Drawing Sheets

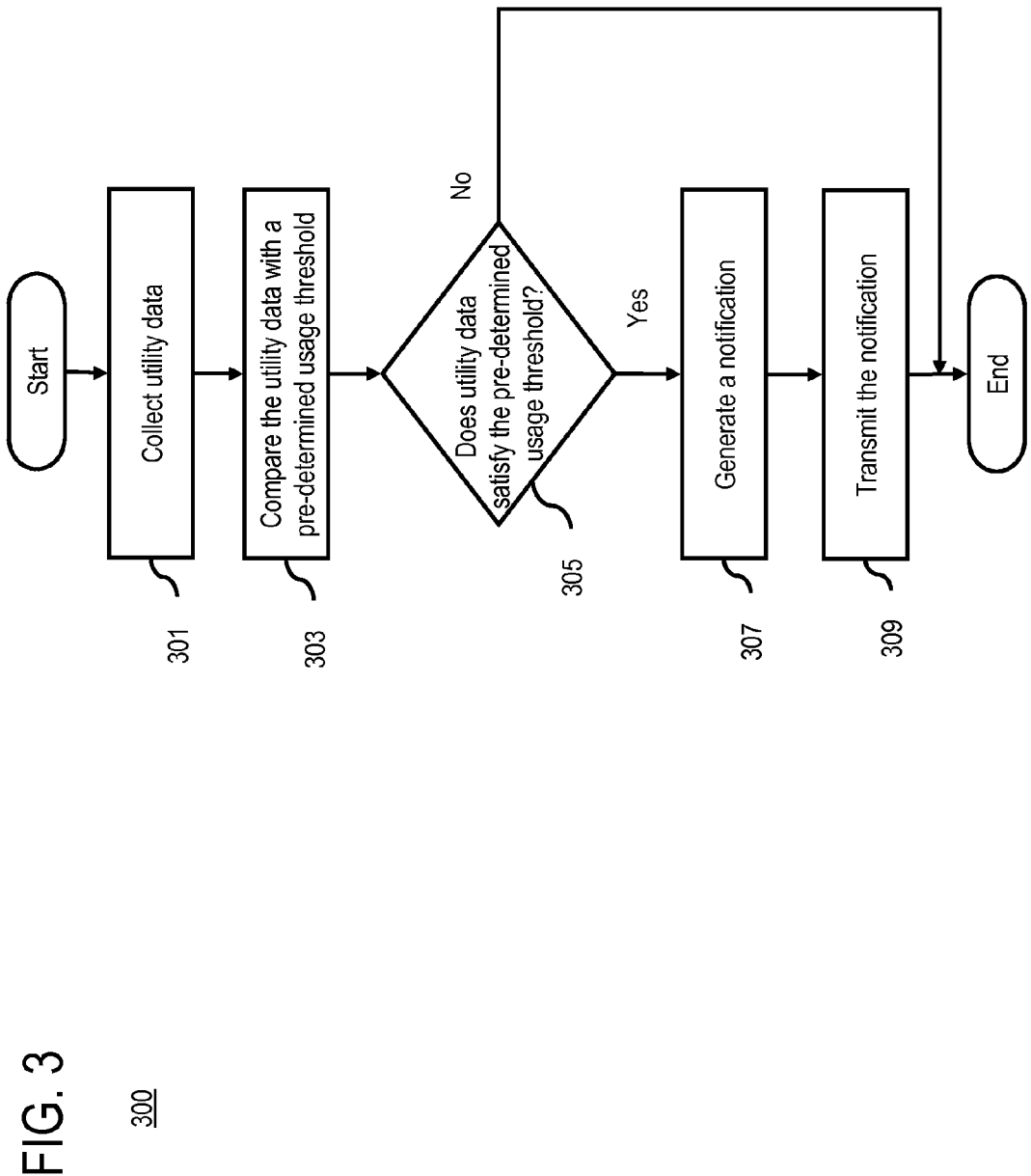

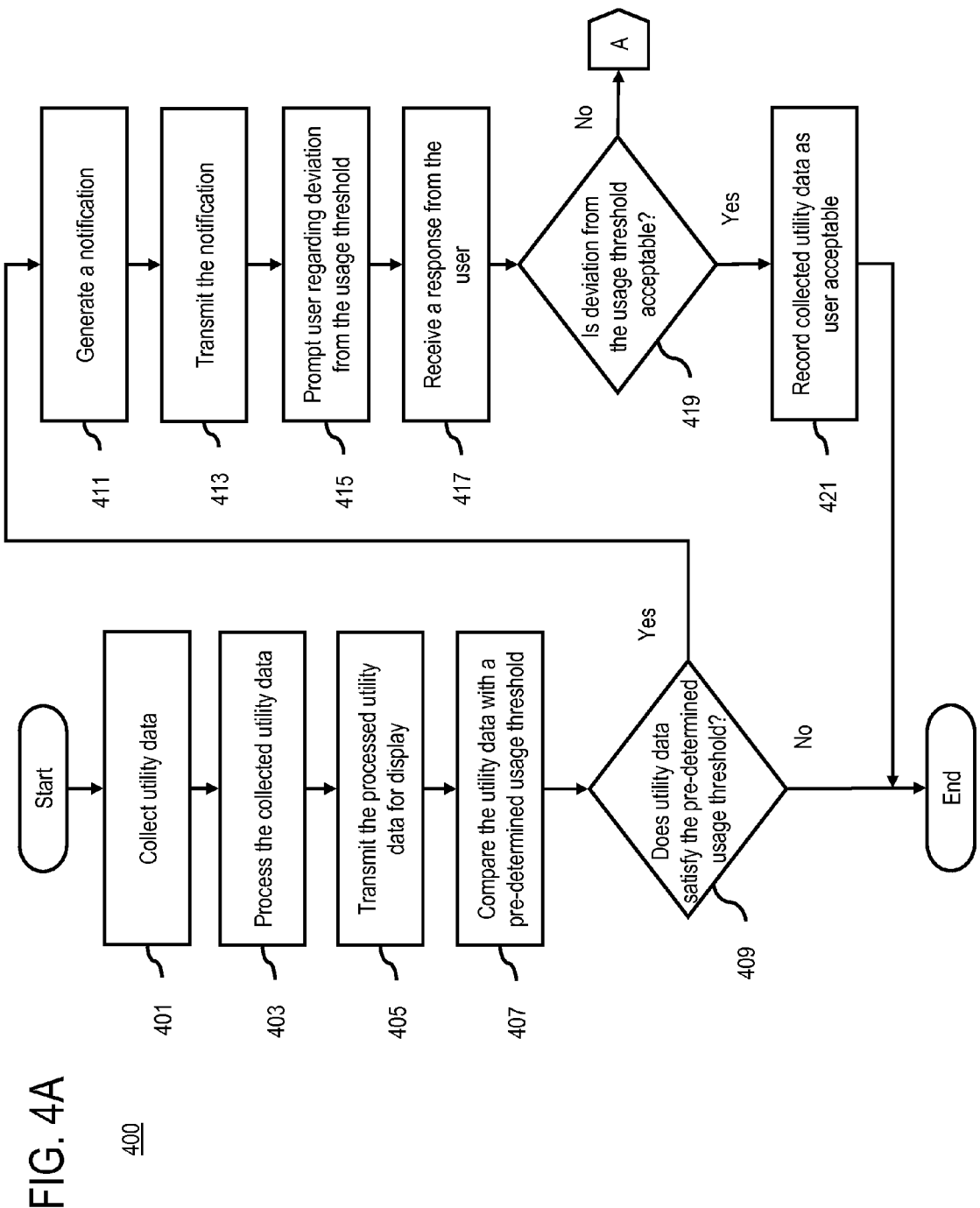

440

500

METHOD AND APPARATUS FOR UTILITY USAGE MONITORING

BACKGROUND INFORMATION

With advances in communication technology, consumers have grown accustomed to greater and greater convenience in conducting business transactions as well as personal errands. Such convenience is tied to having a computer and associated networking infrastructure (e.g., router with broadband access), which has enabled a host of on-line commerce activities. For example, users can readily access banking information and initiate bill payments using a home computer. Also, these on-line activities are largely confined to purchasing goods and services. Other than bill payment or traditional on-line commerce capabilities, little effort has been expended to integrating other consumer transactions relating to such ubiquitous services as utility services (e.g., water, electricity, gas, etc.). As part of their operations, utility providers measure utility usage by a residential home or a commercial building, and typically, generate utility bills that are sent to consumers on a monthly basis via snail mail. Unfortunately, with these types of services, consumers are not able to manage any aspect of their account and service.

Additionally, service providers, e.g., communication and media providers, are challenged to continually develop innovative services to remain competitive and profitable.

Therefore, there is a need for an approach to monitor utility usage with more convenience, while enabling a new source of revenue for service providers.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 3 is a flowchart of a process for monitoring utility usage and generating notification, according to an exemplary embodiment;

FIGS. 4A and 4B are flowcharts of a process for monitoring utility usage and generating notification, according to an exemplary embodiment;

DESCRIPTION OF THE PREFERRED EMBODIMENT

A preferred apparatus, method, and system for monitoring utility usage and generating notification are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
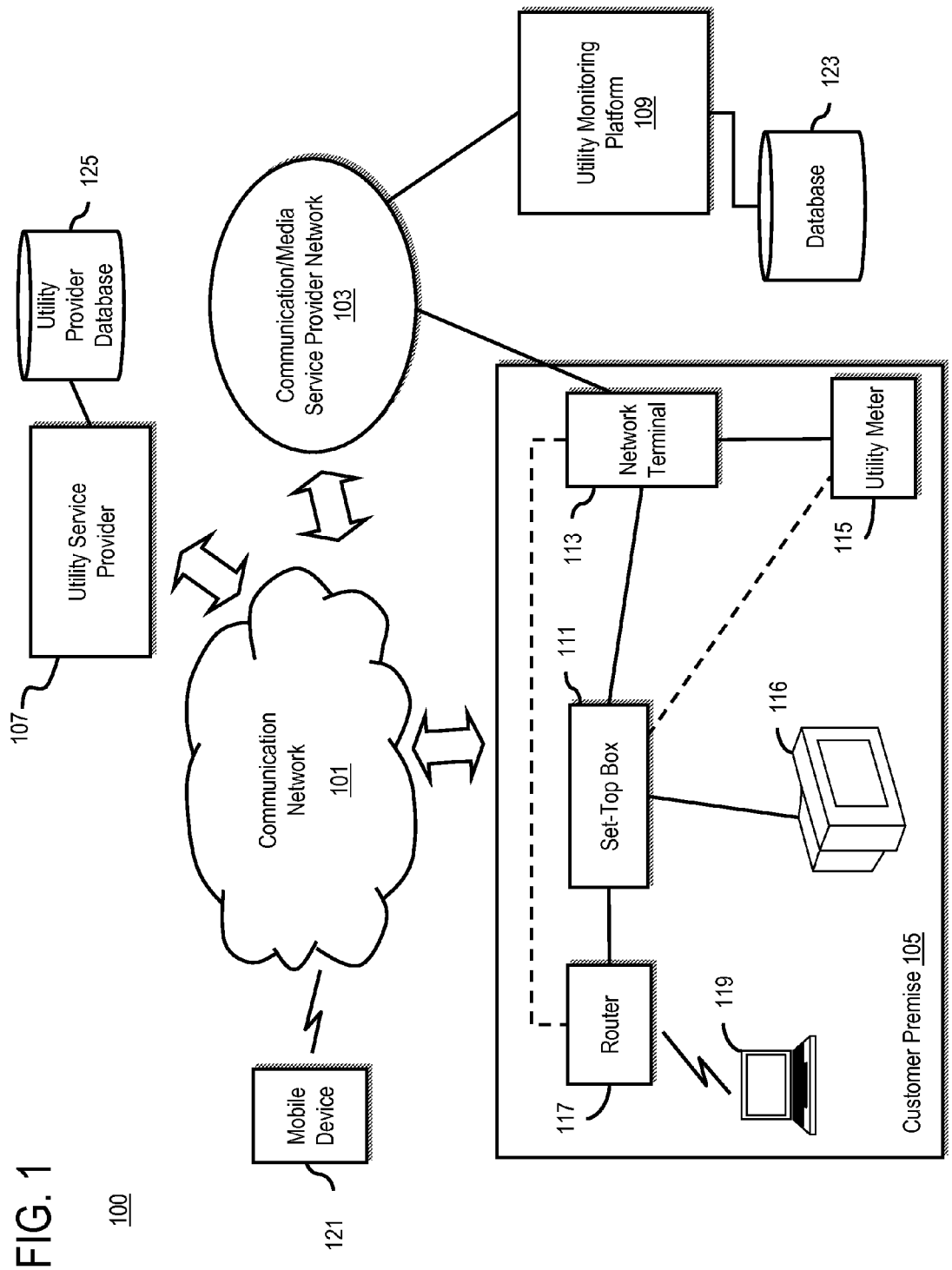
FIG. 1 is a diagram of a system capable of monitoring utility usage and generating notifications relating to the usage, according to an exemplary embodiment.

FIG. 1 is a diagram of a system capable of monitoring utility usage and generating notifications relating to the usage, according to an exemplary embodiment. For the purposes of illustration, a mechanism for monitoring utility usage and generating notification is described with respect to system 100, which includes a communication network 101 that provides connectivity between a service provider network 103 and a user or customer premise 105. Under this scenario, the service provider network 103 can also interface with a utility service provider 107 using the communication network 101. In one exemplary embodiment, the service provider that operates network 103 may be an entity that provides communications and/or media delivery services to users (e.g. subscribers, consumers, etc.). These services can include wireless phone services, wireline phone services, internet services, content services (such as TV), etc. In one exemplary embodiment, service provider can provide a bundled communications (Internet, telephone, and TV) service such as FiOS®. The service provider can distribute media content through the service provider network 103 directly or indirectly via the network 101 to the customer premise 105. Such content can be received by the set-top box 111 directly or through a network terminal 113 (which, for example, may be an optical network terminal (ONT) in the case of FiOS®).

According to certain embodiments, the service provider network 103 includes a utility monitoring platform 109 for communicating with the utility service provider 107 to exchange data relating to consumption or usage of the utility service. For example, the monitoring platform 109 can receive utility usage data from a set-top box (STB) 111 within customer premise 105.

In one embodiment, the set-top box 111 interfaces with a utility meter 115 through the network terminal 113. The network terminal 113 can be a device that serves as an interface to the service provider 103. The utility meter 115 measures the consumption of the utility service by the customer premise 105. Alternatively, the utility meter 115 can be configured to communicate directly with the set-top box 111 using a wireless link or a wired link.

As used herein, the terms set-top box, media-based device, and user equipment are interchangeable, to denote a device capable of receiving content from the service provider network 103. Furthermore, content is contemplated broadly to include a wide range of media. Content can include any audio-video content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, etc.), Internet-based content (e.g., streamed video), and/or any other equivalent media form.

Furthermore, set-top box 111 can be used to receive voice, video, and data from network terminal 113 and to present such content to various devices, such as display 116. In one embodiment, a router 117 can be connected to set-top box 111 and can provide access to a public data network (e.g., the global Internet) to a user device, such as computing device 119 (e.g., laptop, desktop computer, web appliance, etc.). Alternatively or additionally, router 117 can be directly connected to network terminal 113. In another embodiment, router 117 can be included in (or integrated with) set-top box 111, such that set-top box 111 can provide, for instance, Internet access to device 119. However, it is contemplated that other combinations may be provided.

In accordance with certain embodiments, a mobile device 121 can communicate with the utility monitoring platform 109 to manage the user's account for the utility service over the communication network 101.

By way of example, the communication network 101 may include one or more networks such as a data network and/or a telephony network. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, the telephony network can be provided via a combination of circuit-switched technologies or a packetized voice infrastructure.

Also, the communication network 101 can include a radio network that supports wireless terminals, which may be fixed or mobile, using various radio access technologies. Different radio technologies are contemplated: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth, ultra-wideband (UWB), the IEEE 802.22 standard, etc.

Although only a single meter 115 is shown, it is contemplated that the customer premise 105 may include multiple utility meters 115 for different utility services. As mentioned, utility meter 115 can be used to measure utility usage for such services as water, gas, electricity, etc. Traditionally, utility usage data that is measured by utility meter 115 are collected by technicians and provided to the utility provider 107. These utility usage data are processed to produce bills on a monthly (or even quarterly) basis to the user. It is recognized the user may not be aware of any problems associated with the service until the bill arrives. That is, the user would recognize that the charge is a great deviate over the norm, in terms of the cost. Hence, the user is not provided with the utility usage data with sufficient frequency to permit the user to take preventive action if there is a problem that caused the unusually high use. To address this problem, utility monitoring platform 109 can collect usage data, with a configurable frequency, from the set-top box 111 and generate a notification to the user if utility usage is not normal.

According to one embodiment, network terminal 113 is operatively connected to utility meter 115 and is able to collect utility usage data from utility meter 115 in an automated fashion. This is in contrast to the traditional approach of manual collection by a technician. Alternatively or additionally, set-top box 111 can operatively be connected to utility meter 115 to directly collect utility usage data. Utility usage data collection can occur based on a predefined schedule or frequency. For example, network terminal 113 and/or set-top box 111 can collect utility usage data on hourly, daily, weekly, etc. basis. Moreover, such collection can be on an on-demand basis or triggered by an event—e.g., during a troubleshooting.

As discussed, utility monitoring platform 109 can process the collected utility usage data and generate notification. Alternatively or additionally, the functions of the utility monitoring platform 109 can reside within set-top box 111. Utility monitoring platform 109 can receive utility usage data that is collected from utility meter 115 (using network terminal 113 and/or set-top box 111), as well as from other meters within other users' premises (not shown). The platform 109 can access database 123 that stores profile of the users. User profile can include account information as well as information relating to utility usage, such as user specified usage thresholds. Utility monitoring platform 109 can compare the collected utility data for the user to the stored usage threshold. Different notifications can be generated based on the comparison. In one exemplary embodiment, if utility usage data shows that user's usage is more than the usage threshold stored for the user, an alert message can be sent to the user for appropriate action. The process is more fully described with respect to FIGS. 4A and 4B.

In certain embodiments, utility monitoring platform 109 can prompt the user with a series of questions to determine an appropriate action to pursue. For instance, utility monitoring platform 109 can prompt the user to determine whether differences between utility usage data and usage threshold defined for the user is acceptable to the user or not. If deviation of utility usage data is acceptable to user, utility monitoring platform 109 can record the utility usage data as user acceptable. However, if the user indicates that deviation of utility usage data from usage thresholds is not acceptable, utility monitoring platform 109 can further prompt the user to determine whether a service request needs to be generated and sent to a utility provider (such as utility provider 107). In one exemplary embodiment, the user can decide to take no action, therefore, utility monitoring platform 109 can record that no action was taken by the user. However, the user may decide to send a service request to the utility provider (such as utility provider 107).

In one exemplary embodiment, utility monitoring platform 109 can prompt the user with a list of third party vendors that are capable of performing maintenance and repair of utility measured by the utility meter 115. In the case of multiple meters (and thus multiple utility services), the user can specify a particular utility service to the utility monitoring platform 109 and either directly or through utility monitoring platform 109 can contact the utility service. For instance, the platform 109 can provide an option for the user to initiate a trouble ticket with the utility provider 107. In one exemplary embodiment, utility monitoring platform 109 can connect the user to utility provider 107; i.e., assist with establishing a communication session between the user with the utility provider 107.

In one embodiment, utility monitoring platform 109 can generate and provide notifications using various different media. For example, processed usage data and/or notifications can be presented on the display device 116 through set-top box 111. A graphical user interface (GUI) can be used to present the information and/or interact with the user. Also, processed data and/or notifications can be presented to the user using on computing device 119 using a web portal (not shown) supported by utility monitoring platform 109. Alternatively or additionally, this information can be presented to the user via mobile device 121, which can be a wireless phone device.

According to one embodiment, utility monitoring platform 109 can be used to set up a new user profile or update an existing one. In one example, utility monitoring platform 109 can provide a graphical user interface (GUI) to prompt the user to enter information that is needed for the user profile. For example, this information can include information regarding the user's premise that is relevant to determining consumption, information regarding typical utility usage pattern, information regarding preferred utility services, utility usage thresholds, etc. In one example, utility monitoring platform 109 can retrieve average utility usage data from a utility provider database 125 and determine utility usage thresholds based on the retrieved data. According to certain embodiments, such average can be based on targeted sampling. That is, baselines for the usage can be set using data collected from the specific user, based on statistical averages of all users, or on statistical sampling of "like" users—e.g., users in the same community, users with similar demographics, users with similar homes, etc).

In one exemplary embodiment, utility monitoring platform 109 can further process utility usage data that is collected from utility meter 115. For example, utility monitoring platform 109 can perform statistical analysis on the collected data, can generate reports on usage trends, and/or can format the collected data or any information associated with the collected data into compatible format for display. Such information can be stored within database 123.

Approaches for monitoring utility usage and generating notification are more fully described below with respect to FIGS. 2-5.

Figure 2:
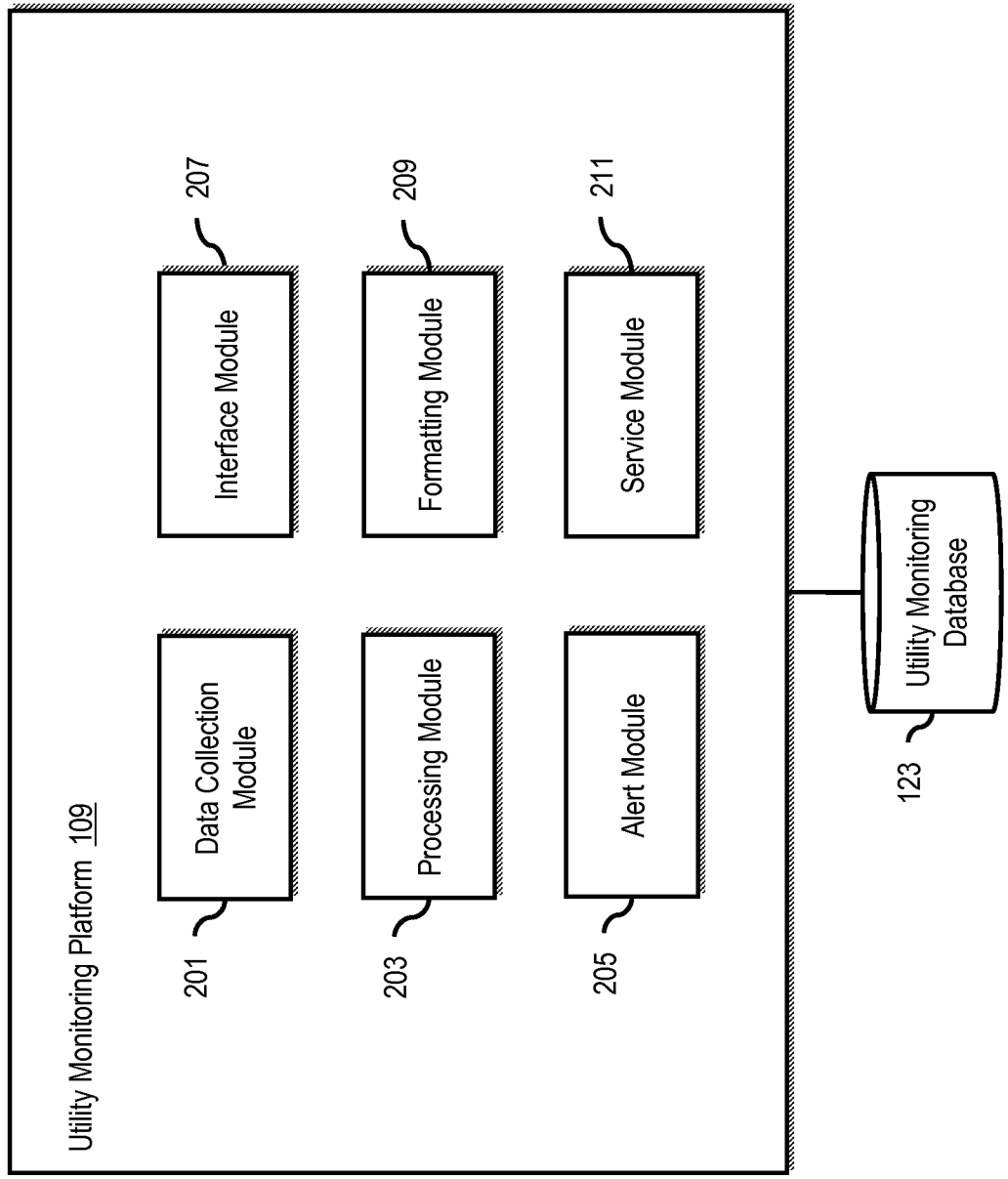
FIG. 2 is a diagram of components of a utility monitoring platform in the system of FIG. 1, according to an exemplary embodiment.

FIG. 2 is a diagram of components of utility monitoring platform 109 of FIG. 1, according to an exemplary embodiment. For the purposes of illustration, utility monitoring platform 109 can include a data collection module 201, a processing module 203, an alert module 205, an interface module 207, a formatting module 209, and a service module 211. As shown, utility monitoring platform 109 can be connected to a utility monitoring database 123.

In this example, data collection module 201 is configured to collect utility usage data from utility meters (such as utility meter 115 within premise 105). Data collection module 201 can directly collect utility usage data from utility meters or indirectly through network terminal 113 of system 100 and/or through communication network 101. Processing module 203 of utility monitoring platform 109 can process the collected utility usage data. In one exemplary embodiment, processing module 203 can compare the collected utility usage data with a usage threshold and determine whether the collected utility usage data satisfies the usage threshold. Alternatively or additionally, processing module 203 can analyze the collected utility usage data and can generate reports on usage trends. In one embodiment, this data can be made available to the user. The usage threshold can be any metric (e.g., kilowatt hour, gallons, etc.), including cost metrics, such as dollar amount. For example, the user may wish to be alerted when usage exceeds a cost threshold, thereby enabling the user to more intuitively budget such usage.

Further, alert module 205 can generate notification messages based on the determination whether the collected utility usage data satisfies usage threshold. Alert module 205 can provide generated notifications to the user through different media (which may be specified by the user in the user profile) and technologies, such as presenting through a graphical user interface on a TV set, via a website, and/or using a wireless phone device. It is contemplated other methods can be used. Interface module 207 can control the graphical user interface for interaction with the user. The graphical user interface can be used to present notification messages to the user, interact with the user to set up a user's profile, interact with the user to dispatch utility service, etc.

Moreover, utility monitoring platform 109 can include a formatting module 209. Formatting module 209 can format the processed data prepared by processing module 203 (such as usage trend reports) to a compatible format for presentation on user devices. Further, utility monitoring platform 109 can include a service module 211. Service module 211 can interact with the user and utility provider 107 of system 100 regarding service requests. In one exemplary embodiment, if processing module 203 determines that collected utility usage data is atypical (based on defined usage thresholds), service module 211 can interact with the user to determine if service requests should be generated and sent to utility providers (such as utility provider 107 of system 100). For example, service module 211 can have access to a list of third party vendors that are capable of performing maintenance and repair. Alternatively or additionally, service module 211 can access the user's profile that can include information regarding preferred utility services.

In the embodiment of FIG. 2, utility monitoring platform 109 can have access to a utility monitoring database 123. Utility monitoring database 123 can be configured to store user profiles, utility usage data, information regarding utility providers, information regarding third party vendors capable of performing maintenance and repair, etc. In one exemplary embodiment, utility monitoring platform 109 can be configured to operate at the set-top box 111 while the utility monitoring database 123 is managed by the service provider.

FIG. 3 is a flowchart of a process for monitoring utility usage and generating notification, according to an exemplary embodiment. In on embodiment, the process 300 can be performed at utility monitoring platform 109 of FIG. 1. It is noted that utility monitoring platform 109 can be configured to operate at the service provider network 103; also, some or all of the functionalities of the platform 109 can be performed at set-top box 111. In step 301, utility usage data is collected from, for example, utility meter 115.

In step 303, the process 300 compares the collected utility usage data with one or more pre-determined usage thresholds.

In one exemplary embodiment, a utility threshold can be stored along with user profile at utility monitoring database 123. In step 305, the process 300 determines whether the collected utility usage data satisfies the usage threshold. For example, the process 300 determines whether the utility usage data exceeds the usage threshold. In one embodiment, the usage threshold is set automatically based on a historical usage pattern, or specified by the user. Moreover, the threshold can be set according to any unit that is suitable for the particular service, or according to a dollar amount.

If the process 300 determines that the threshold is not satisfied (for example, there is an abnormality in the usage data), then, as in step 307, a notification is generated to alert the user. In step 309, the notification is transmitted to a user device to be presented to the user. As noted, various methods can be employed to present this alert—e.g., via the set-top box 111.

Figure 4B:
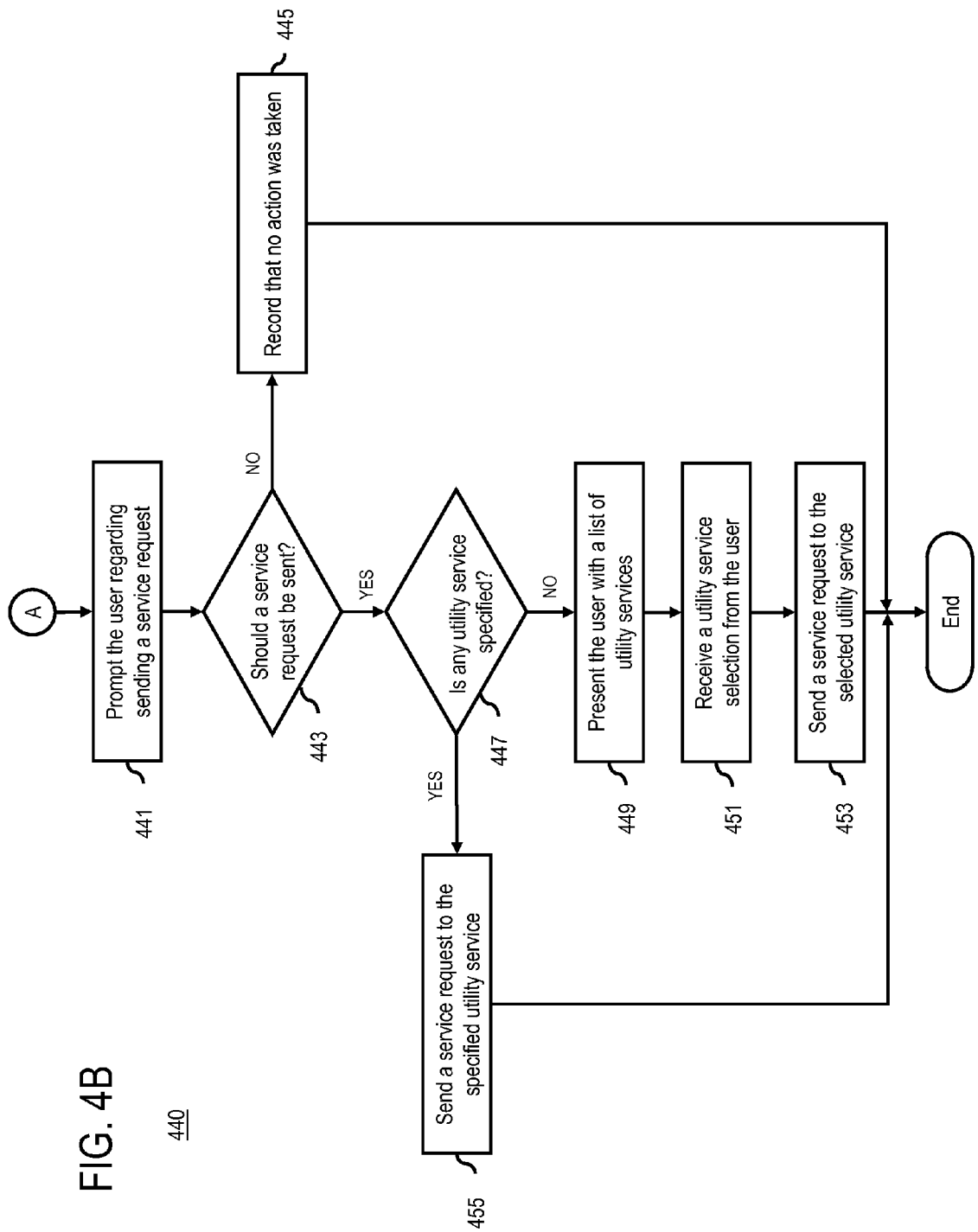

FIGS. 4A and 4B are flowcharts of a process for monitoring utility usage and generating notification, according to another exemplary embodiment. In step 401, the process 400 collects utility usage information directly or indirectly from utility meters. In step 403, the collected utility data can be processed. For example, the process 400 can statistically analyze the collected utility usage data, generate usage trend reports, format the processed data into a format compatible for display on user devices, etc. In step 405, the process 400 can transmit the processed usage data to user devices to be presented to the user, for example, through a graphical user interface provided by the set-top box 111.

In step 407, the utility monitoring platform 109 can compare the collected utility usage data or some information associated to the usage data with pre-determined usage threshold. In step 409, based on comparison of step 407, the process 400 determines whether the utility usage data satisfies the pre-determined usage threshold. Such determination can conclude whether utility usage is normal for the particular user profile. If it is determined that the threshold is not satisfied (e.g., threshold exceeded), a notification message is generated, per step 411. In step 413, the notification message is transmitted to a device, e.g., set-top box 111, for presentation to the user.

In step 415, the utility monitoring platform 109 can prompt the user to determine whether deviation of the utility usage from the usage threshold is acceptable to the user. As explained, the utility monitoring platform 109 can prompt the user using a graphical user interface. In step 417, the process 400 receives a response from the user, for example, through the graphical user interface. In step 419, the process 400 determines whether the deviation is acceptable. If it is determined that the deviation is acceptable, the process 400 continues to step 421. In step 421, the process 400 records the collected utility usage data as user acceptable.

However, if it is determined that the deviation of utility usage from the threshold is not acceptable to the user, the process 400 prompts, per step 441, the user regarding a service request. Based on user's response, in step 443, the process 440 determines whether a service request should be generated and sent to dispatch a utility service technician. If the user indicates that the service request should not be sent, the process 440 records that no action was taken (step 445). However, if it is determined that the service request should be sent, in step 447, the process 440 determines whether a utility service is specified for the user. For example, user profile can include information regarding preferred utility services for the user. If the specified utility service exists for the user, the service request is generated and transmitted to the specified utility service for dispatching a utility service technician associated with the utility meter (step 455). In one exemplary embodiment, the utility service can be associated with a utility provider associated with the utility meter.

In step 447, a determination is made that no preferred utility service is specified for the user, the process 440, as in step 449, the user can be presented with a list of utility services. For example, the list of utility services can include a list of third party vendors capable of performing maintenance and repair of a utility service measured by the utility meter. According to one embodiment, the process 440 can determine and retrieve the list of utility services based on information associated with the user (such as geographical location of the user, utility provider serving the user, etc.). In step 451, the process 440 receives a utility service selection from the user. In step 453, the service request is generated by the utility monitoring platform and is transmitted to the selected utility service.

Figure 5:
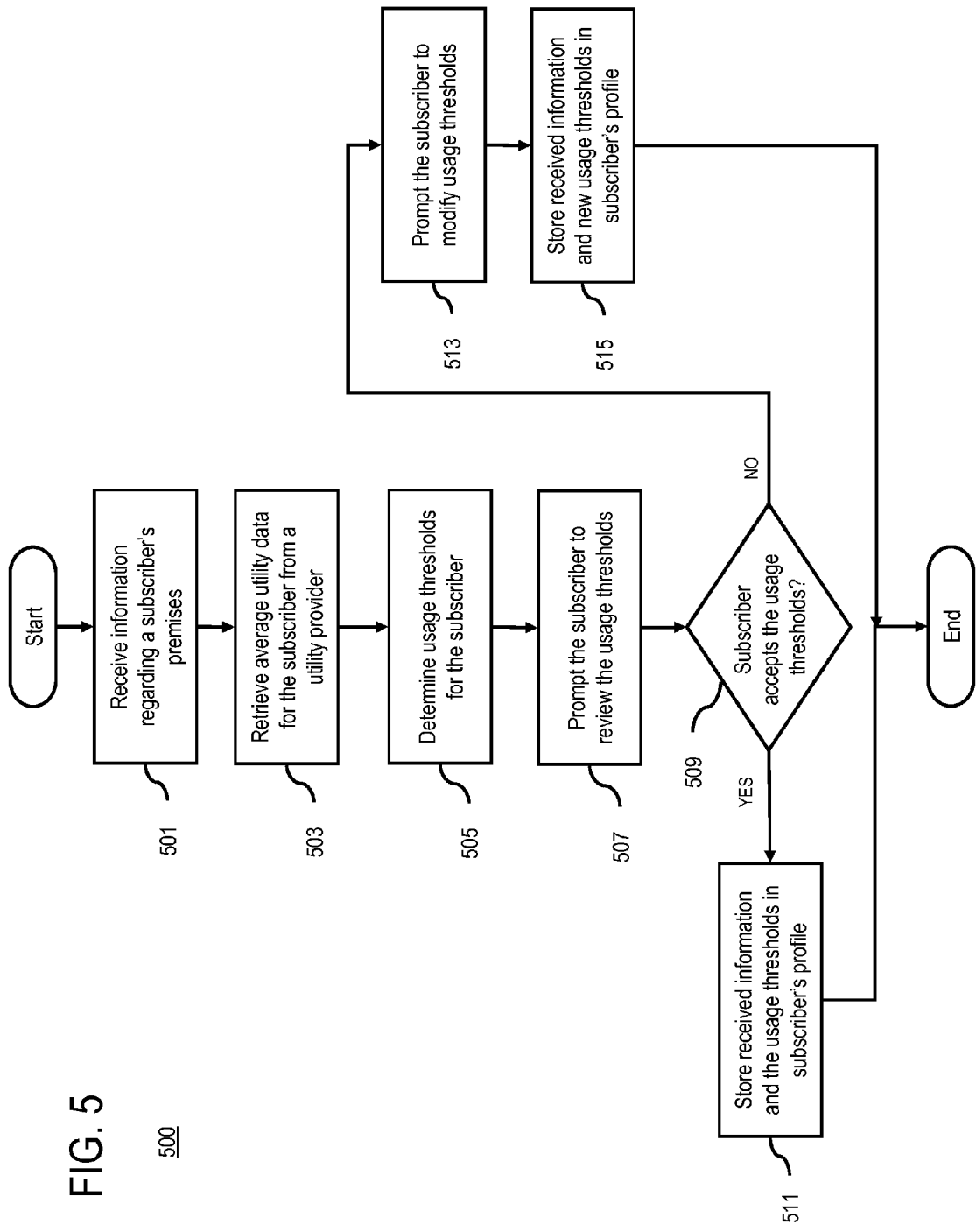
FIG. 5 is a flowchart of a process for creating and updating subscriber utility profile, according to an exemplary embodiment.

FIG. 5 is a flowchart of a process for creating and updating a subscriber utility profile for monitoring utility usage and generating notification, according to an exemplary embodiment. In step 501, information associated with a premise of a user (e.g., a subscriber) is received. This information can include any data that may have relevance to consumption of a utility service, such as number of rooms, bathrooms, number of people living in the premise, etc. Also, additional information such as information regarding typical utility usage pattern, information regarding preferred utility services, utility usage thresholds, etc. can be used to set up the user's profile.

In step 503, the process 500 retrieves average utility usage data for the subscriber. In one exemplary embodiment, the process 500 can receive average utility usage data from the user. Additionally or alternatively, the process 500 can retrieve average utility usage data from a utility provider (e.g., utility provider 107). In step 505, the process 500 can determine usage thresholds based on collected information. The utility thresholds can be used later to determine normality of utility usage by the user. In step 507, the usage threshold can be presented to the user for review. As mentioned various methods can be used to determine the average, as by sampling usage of a particular user, usage relating to the community to which the user belongs, etc.

In step 509, the process 500 determines whether the user accepts the usage thresholds. If the user finds the thresholds to be acceptable, the process 500 stores the user information and thresholds in the user profile in step 511. However, if the user wishes to set different thresholds, the user is prompted to modify the usage thresholds, in step 513. In step 515, user information and modified usage thresholds are stored, for example, in utility monitoring database 123 of FIG. 2.

The described processes and arrangement advantageously enables users to conveniently manage utility service usage. In one embodiment, this capability can be provided through a set-top box, thereby obviating the need for a separate computer to utilize such service. In this manner, the user is assured that utility usage data is collected and processed accurately, while permitting certain controls with respect to utility service usage.

The processes described herein for monitoring utility usage and generating notification may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
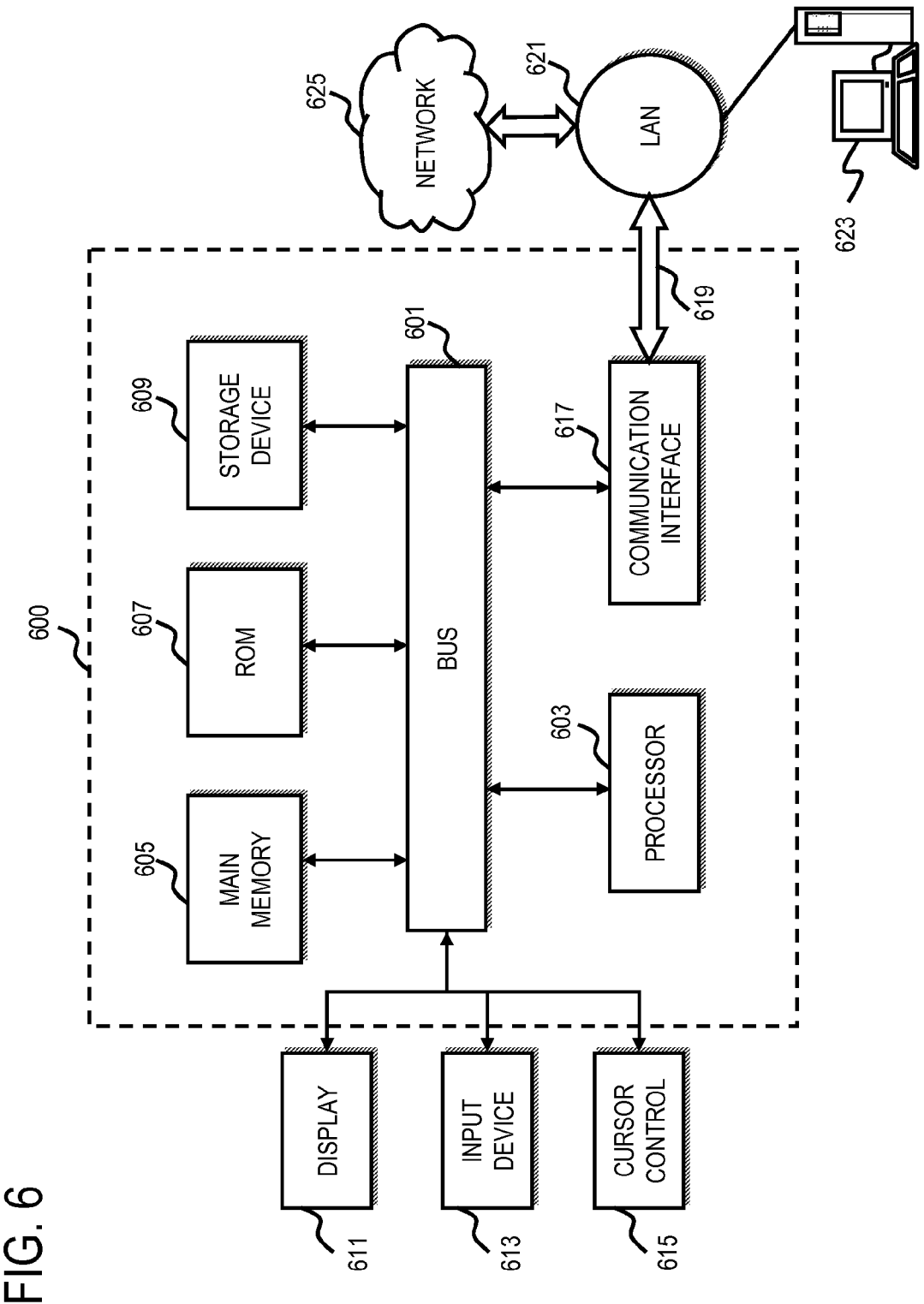
FIG. 6 is a diagram of a computer system that can be used to implement various exemplary embodiments.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   collecting utility data, at a set-top box, from a utility meter of a subscriber;
   determining whether the utility data satisfies a usage threshold of the subscriber;
   generating a notification based on the determination;
   presenting the notification via the set-top box;
   prompting, via the set-top box, to determine whether deviation from the usage threshold is acceptable to the subscriber; and
   prompting, via the set-top box, for dispatching a utility service technician of a utility provider associated with the utility meter.

2. A method according to claim 1, wherein the set-top box is associated with a service provider, the method further comprising:
   transmitting the utility data via the set-top box over a data network to a database managed by the service provider.

3. A method according to claim 1, further comprising:
   presenting a list of third party vendors capable of performing maintenance and repair of a utility service measured by the utility meter.

4. A method according to claim 3, further comprising:
   receiving a selection of a third party vendor capable of performing maintenance and repair;
   generating a service request based on at least one of the utility data, the usage threshold, and the selected third party vendor; and
   transmitting the service request to the selected third party vendor.

5. A method according to claim 1, further comprising:
   retrieving information associated to a third party vendor capable of performing maintenance and repair of a utility service measured by the utility meter;
   generating a service request based on at least one of the utility data, the usage threshold, and the third party vendor; and
   transmitting the service request to the third party vendor.

6. A method according to claim 1, wherein the set-top box is configured to present broadcast content.

7. A set-top box apparatus comprising:
   a memory configured to store utility data collected from a utility meter of a subscriber; and
   a processor configured to:
      determine whether the utility data satisfies a usage threshold of the subscriber;
      generate a notification based on the determination;
      present the notification;
      generate a prompt for determining whether deviation from the usage threshold is acceptable to the subscriber; and
      generate a prompt for dispatching a utility service technician of a utility provider associated with the utility meter.

8. An apparatus according to claim 7, wherein the apparatus is associated with a service provider, the apparatus further comprising:
   a communication interface configured to transmit the utility data over a data network to a database managed by the service provider.

9. An apparatus according to claim 7, wherein the processor is further configured to initiate presentation of a list of third party vendors capable of performing maintenance and repair of a utility service measured by the utility meter.

10. An apparatus according to claim 9, wherein the processor is further configured to receive a selection of a third party vendor capable of performing maintenance and repair, to generate a service request based on at least one of the utility data, the usage threshold, and the selected third party vendor, and to transmit the service request to the selected third party vendor.

11. An apparatus according to claim 7, wherein the processor is further configured to retrieve information associated to a third party vendor capable of performing maintenance and repair of a utility service measured by the utility meter, to generate a service request based on at least one of the utility data, the usage threshold, and the third party vendor, and to transmit the service request to the third party vendor.

12. An apparatus according to claim 7, wherein the processor is further configured to initiate presentation of broadcast content.

13. A method comprising:
   receiving utility data from a plurality of set-top boxes of a respective plurality of subscribers corresponding to a service provider, wherein the utility data is collected from a plurality of meters maintained by a utility provider;
   storing the utility data in a database maintained by the service provider;
   storing a profile for one of the subscribers, wherein the profile specifies a usage threshold of the one subscriber;
   determining whether the utility data of the one subscriber satisfies the usage threshold;
   generating a notification based on the determination; and
   transmitting the notification to a corresponding one of the set-top boxes of the one subscriber.

14. A system comprising:
   a utility monitoring platform configured to receive utility data from a plurality of set-top boxes of a respective plurality of subscribers corresponding to a service provider, wherein the utility data is collected from a plurality of meters maintained by a utility provider; and
   a database configured to store the utility data in a database maintained by the service provider and a profile for one of the subscribers, wherein the profile specifies a usage threshold of the one subscriber,
   wherein the platform is further configured to determine whether the utility data of the one subscriber satisfies the usage threshold, to generate a notification based on the determination, and to initiate transmission of the notification to a corresponding one of the set-top boxes of the one subscriber.

* * * * *